United States Patent [19]

Schoettle

[11] Patent Number: 5,494,159
[45] Date of Patent: Feb. 27, 1996

[54] CONTAINER FOR TAPE CASSETTES

[75] Inventor: Klaus Schoettle, Heidelberg, Germany

[73] Assignee: BASF Magnetics GmbH, Mannheim, Germany

[21] Appl. No.: 293,195

[22] Filed: Aug. 19, 1994

Related U.S. Application Data

[63] Continuation of Ser. No. 85,906, Jul. 6, 1993, abandoned.

[30] Foreign Application Priority Data

Jul. 10, 1992 [DE] Germany .................... 9209267 U

[51] Int. Cl.$^6$ ................................................ B65D 85/672
[52] U.S. Cl. ............................... 206/387.1; 206/493
[58] Field of Search ............................ 206/387, 309, 206/367, 493, 387.1, 387.11, 387.12, 387.13, 387.14, 387.15

[56] References Cited

U.S. PATENT DOCUMENTS

| | | | |
|---|---|---|---|
| 3,532,211 | 1/1969 | Gellert | 206/387 |
| 3,635,684 | 8/1972 | Schindler et al. | 206/387 X |
| 3,990,575 | 11/1976 | Egly et al. | 206/387 |
| 4,235,334 | 11/1980 | Ahn | 206/387 |
| 4,627,534 | 12/1986 | Komiyama et al. | 206/387 |
| 5,109,982 | 5/1992 | Morita | 206/387 |
| 5,143,209 | 9/1992 | Boshek, Jr. | 206/387 X |
| 5,154,287 | 10/1992 | Morita | 206/387 |
| 5,160,028 | 11/1992 | Morita | 206/387 |
| 5,186,325 | 2/1993 | Sato et al. | 206/387 X |

FOREIGN PATENT DOCUMENTS

| | | | |
|---|---|---|---|
| 1300864 | 11/1972 | Germany . | |
| 2079726 | 1/1982 | United Kingdom | 206/387 |

Primary Examiner—Bryon P. Gehman
Assistant Examiner—Ted Kavanaugh
Attorney, Agent, or Firm—Keil & Weinkauf

[57] ABSTRACT

A container for a tape cassette of approximately parallelepiped form having an elevated head part is formed with a bottom wall and a lid wall which can move with respect to each other by means of hinge devices. In this arrangement, if appropriate, one of said walls is provided with a pocket for receiving the elevated head part and has a decreasing wall thickness along its transverse axis from its outer longitudinal edge in the direction of the axis of the hinge devices or of the pocket. The other wall may likewise have a wall thickness decreasing in the same direction. The inner face of the wall provided with the pocket may also be arranged parallel, at least with respect to the inner face of the front wall of the pocket. The container can be used advantageously for any cassette of the type more precisely specified above for audio, video and/or data recording, since a minimal overall height of the container is achieved with minimal use of material.

15 Claims, 2 Drawing Sheets

CONTAINER FOR TAPE CASSETTES

This application is a continuation of application Ser. No. 08/085,906, filed on Jul. 6, 1993 now abandoned.

The invention relates to a container, substantially of rectangular parallelepiped form, for tape cassettes having an elevated head part, in particular for compact cassettes, with a bottom part which has at least one bottom wall and a rear wall and/or a front wall and bottom-part side walls, and with a lid part which comprises at least a lid wall and, if appropriate, has a receiving pocket with at least one pocket front wall for the tape cassette.

For compact cassettes with two hubs in coplanar arrangement as tape carriers, a cassette container in case form is known, for example from German Published Application DE-AS 1,300,864.

The head part of the cassette is housed therein in a pocket top part, the clear width of which is significantly greater than the height of the head part. Arranged on the bottom wall are locking pins, which engage to a greater or lesser extent into the hubs when the container is closed. Depending on the extent to which the pins engage, the cassette lies either at a slant or virtually straight with respect to the container bottom and lid walls, so that there is considerable useless space in the container and said container becomes too high as a result.

Seen from the side of the container to be opened, the bottom and lid walls of such containers are formed with small wall thickness and with greater wall thickness towards the hinge connections, in order to be able to demold the parts produced by injection molding.

A further container of the type outlined above is known on the compact cassette market, said container being characterized by an extremely thin wall thickness of the pocket front wall and of the adjoining parts of the bottom wall, in order to reduce the overall height of the container in the region of the head elevation of the cassette.

On account of the production by injection molding, the lid wall and pocket front wall are arranged divergently in the form of a wedge, so that there are limits to reducing the overall height of the container.

It is an object of the present invention to provide a container of the type described of very small height with unchanged direction of insertion of the cassette into the container.

We have found that this object is achieved by a container, substantially of rectangular parallelepided form, for tape cassettes having an elevated head part, in particular for compact cassettes, with a bottom part which has at least one bottom wall and a rear wall and/or a front wall and bottom-part side walls, and with a lid part which comprises at least a lid wall and has a receiving pocket with at least one pocket front wall for the tape cassette, wherein the lid wall has a decreasing wall thickness along the transverse axes of the container from its outer longitudinal edge in the direction to the receiving pocket.

In comparison with the conventional containers (snap packs), a distinct reduction in height of more than 2 mm is obtained and, in comparison with the container version with reduced pocket front wall, a height reduction of more than half a millimeter is obtained.

In contrast to other container versions in which the cassette is not inserted with the head part first but with the rear part first, the user of the container according to the invention does not have to get used to such a change and inserts the cassette into the container with the head part first.

It is favorable from a production viewpoint if the inner face of the pocket front wall is arranged at least parallel with respect to the inner face of the lid wall which has the decreasing wall thickness.

An angle between about 30 and about 120 angular minutes, in particular of about 50 angular minutes, has proved to be advantageous between the inner face and the outer face of the lid wall.

According to the invention, the wall thickness of the lid wall may decrease virtually from the outer longitudinal edge to the pocket continuously or discontinuously, in particular with a step or drop.

In dimensioning it is expedient that the wall thickness of the lid wall decreases from the outer longitudinal edge in the direction to the receiving pocket at a ratio in the range from about 3:1 to 1.5:1, in particular of about 2:1.

It is also possible for the wall thickness of the bottom wall to decrease in the same direction as the lid wall. The inner face of the bottom wall may expediently likewise have a small angle with respect to its outer face. If the container is formed without receiving pocket for the elevated head part of the cassette, and bottom and lid parts are connected to each other by means of hinge devices, the lid wall and/or the bottom wall may have a decreasing wall thickness along the transverse axes of the container from the respective outer longitudinal edge in the direction to the axis of the hinge devices. This decreasing wall thickness may expediently have the same features as described above with respect to the receiving pocket version.

An advantageous variation of the container is also provided by the closed container having a receiving space for the cassette which is parallelepipedal and lies at a slant within the outer contour.

An exemplary embodiment of a container is represented in FIG. 1 and described below.

DESCRIPTION OF THE PREFERRED EMBODIMENTS

Figure 1:
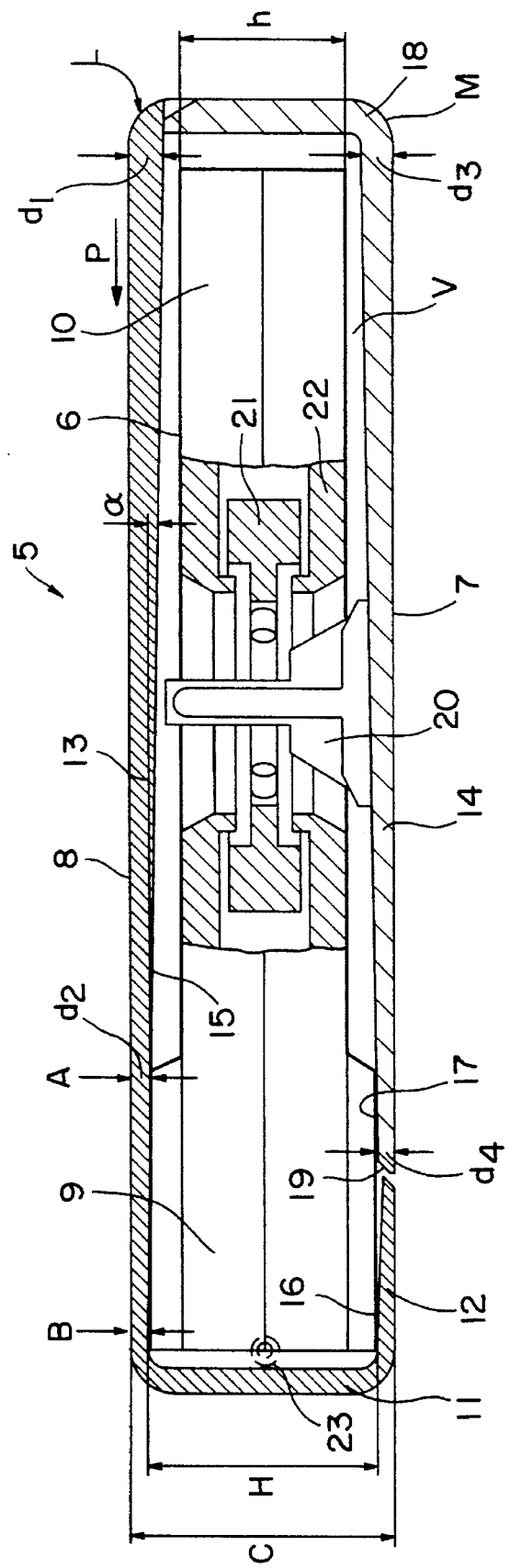
FIG. 1 shows the container in side view.

A container 5 with a compact cassette 6 (in a Philips-type cassette housed therein is shown in cross section and essentially comprises bottom part 7 and lid part 8. The cassette 6 has a head part 9 of increased height H in comparison with the height h of the remaining cassette body 10. If a different tape cassette likewise has an elevation on one longitudinal side, which may serve an entirely different .purpose than that of receiving magnetic heads of the equipment, the container according to the invention is likewise suitable for this tape cassette.

The lid part is formed with a pocket 11 for receiving the head part 9 of the cassette 6. The pocket 11 has the pocket front wall 12.

The lid part 8 comprises a lid wall 13 and the bottom part 7 comprises a bottom wall 14. The latter is connected to the rear wall 18. Bottom-part side walls are not visible due to the sectional representation chosen. The wall thickness d decreases distinctly from the outer longitudinal edge L of the lid wall 13 in the direction of the arrow p, that is in the direction toward the pocket 11. From the value $d_1$ to the value $d_2$, the ratio decreases approximately by 2:1. In terms of the order of magnitude, this thickness ratio is to decrease in the range from about 3:1 to about 1.5:1. In the example chosen, the thickness decreases continuously from the edge L to the longitudinal line A, then to increase again slightly up, to longitudinal line B. Consequently, at the line A a drop is provided and the progression of the decrease in thickness over the transverse axis is discontinuous.

Figure 2:
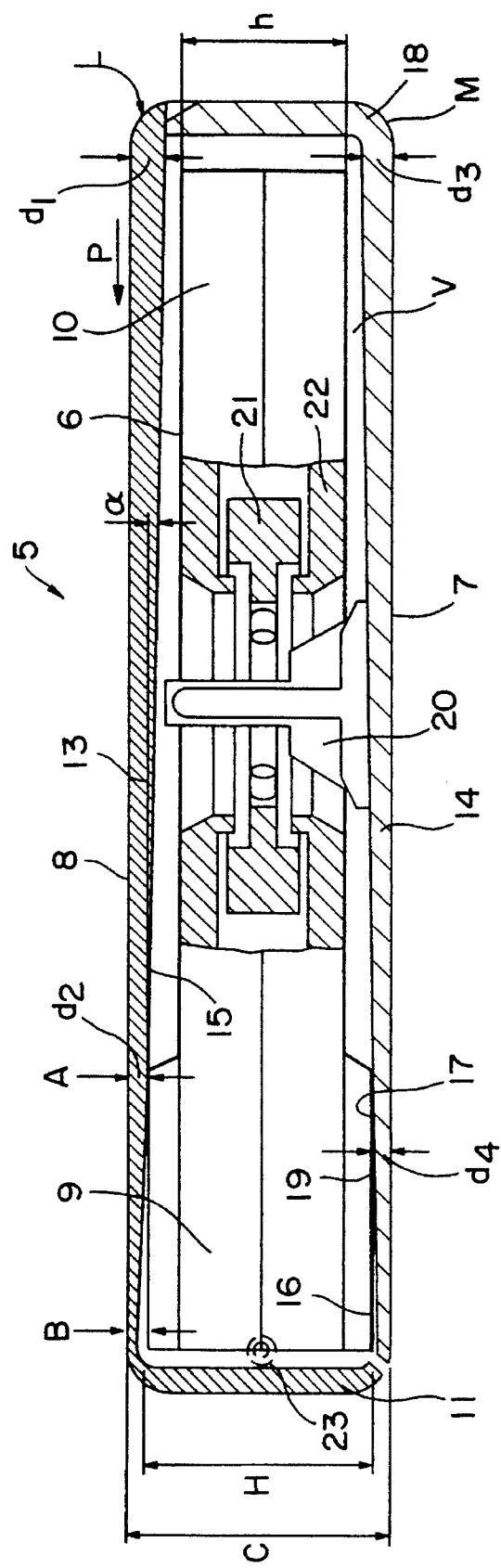
FIG. 2 shows a variation on the container without a pocket front wall (12) in side view, with the lid wall (13) and bottom wall (14) tapering from their outer longitudinal edges to the axis (23) of the hinge devices.

However, as shown in FIG. 2, it is possible also to realize a continuous decrease in the thickness of the lid wall 13 up to the bottom of the pocket 11 (in the vicinity of the line B). In the representation, the angle of decrease α is about 50 angular minutes. However, it may also lie in the range from about 30 to about 120 angular minutes, in particular between 30 and 60 angular minutes.

It is best for the dimensioning of the container 5 if the inner face 15 of the lid wall 13 is arranged parallel with respect to the inner face 16 of the pocket front wall 12. If these faces 15 and 16 are arranged divergently, an excessive container height $H_1 > H$ is obtained in this region. The inner face part 17 of the bottom wall 14 neighboring the pocket front wall 12 may expediently be designed likewise lying parallel with respect to the inner face 15.

As can be seen from the representation, in the example a bottom wall 14 which likewise decreases in thickness from the outer longitudinal edge M was chosen, the thickness $d_3$ in the vicinity of the rear wall 18 corresponding approximately to the thickness $d_1$ of the lid wall 13, but the thickness $d_4$ at the bottom wall cutout 19 being slightly greater than the small thickness $d_2$ at the longitudinal line A of the lid wall 13.

This results for instance in a rectangular parallelepiped hollow space V, which is arranged lying at a slant within the container outer wall faces.

The bottom part 7 also has locking pins 20, which engage in the hubs 21 of the cassette 6 in the cassette housing 22.

Which position the cassette 6 can assume in the container 5 may depend on the form of the locking pins 20 and of the drive opening in the hubs.

In this example represented, apart from the features stated above, the inner form of the container 5 and locking pins 20 are suitably matched to the cassette 6 in order to obtain a very favorable low container height C.

A container for a tape cassette of approximately parallelepiped form having an elevated head part is formed with a bottom wall and a lid wall which can move with respect to each other by means of hinge devices. In this arrangement, one of said walls is formed with decreasing wall thickness along its transverse axis from its outer longitudinal edge in the direction of the axis (23) of the hinge devices. The other wall may likewise have a wall thickness decreasing in the same direction. In this case, one of the walls may also be provided with a pocket for receiving the elevated head part. The inner face of the wall provided with the pocket may also be arranged parallel, at least with respect to the inner face of the front wall of the pocket.

The container can be used advantageously for any cassette of the type more precisely specified above for audio, video and/or data recording, since a minimal overall height C of the container is achieved with minimal use of material.

We claim:

1. A container, substantially of rectangular parallelepiped form, for tape cassettes having an elevated head part, said container having longitudinal axes and inner and outer longitudinal edges and transverse axes and edges, and comprising a bottom part which comprises one bottom wall and a rear wall along one of its longitudinal edges and bottom-part side walls along its transverse edges, and a lid part which comprises a lid wall and has a receiving pocket along its inner longitudinal edge with one pocket front wall and one pocket bottom wall for the tape cassette, wherein the lid wall has a wall thickness along the transverse axis of the container which tapers starting from its outer longitudinal edge over at least part of its length in the direction of the receiving pocket.

2. The container as claimed in claim 1, wherein the pocket front wall is arranged parallel to the lid wall in the area of the receiving pocket.

3. The container as claimed in claim 1, said lid wall having inner and outer faces, wherein an angle between 30 and 120 angular minutes is provided between said inner face and outer faces.

4. The container as claimed in claim 1, wherein the wall thickness of the lid wall, from its outer longitudinal edge at least as far as the receiving pocket, decreases at a ratio from about 3:1 to about 1.5:1.

5. The container as claimed in claim 1, wherein the container when closed has a receiving space for the tape cassette which is substantially parallelepipedal and lies at a slant within the inner faces of the bottom and lid walls.

6. The container as claimed in claim 1, wherein the wall thickness of the bottom wall decreases in the same direction as that of the lid wall, from the rear wall to the receiving pocket.

7. The container as claimed in claim 1, said bottom wall of the container having inner and outer faces, wherein an angle between 30 and 120 angular minutes is likewise provided between the said inner and outer faces.

8. The container as claimed in claim 1, wherein the tape cassette to be received therein is a Philips-type cassette.

9. The container as claimed in claim 1, wherein the wall thickness of the bottom wall tapers from its longitudinal edge in the direction of the receiving pocket at a ratio from about 3:1 to about 1.5:1.

10. A container, substantially of rectangular parallelepiped form, for tape cassettes having an elevated head part, said container comprising inner and outer longitudinal edges and a transverse axis and a bottom part, which comprises one bottom wall and a rear wall along one of its longitudinal edges and bottom-part side walls along its transverse edges, and a lid part which comprises a lid wall and has a receiving pocket along its inner longitudinal edge with one pocket front wall and one pocket bottom wall for the tape cassette, said bottom wall and lid wall each having two longitudinal edges, said bottom part and said lid part being connected to each other by hinge devices having an axis, wherein at least one of said lid wall and said bottom wall has a tapering wall thickness along the transverse axis of the container from the outer longitudinal edge to the axis of the hinge devices.

11. The container as claimed in claim 10, wherein said lid wall has inner and outer faces, and an angle between 30 and 120 angular minutes is provided between said inner and outer faces.

12. The container as claimed in claim 10, wherein the wall thickness of the lid wall tapers from its outer longitudinal edge to the axis of the hinge devices.

13. The container as claimed in claim 10, wherein the wall thickness of at least one of the lid wall and the bottom wall tapers from the outer longitudinal edge to the axis of the hinge devices at a ratio from about 3:1 to about 1.5:1.

14. The container as claimed in claim 10, said bottom wall having inner and outer faces, wherein an angle between 30 and 120 angular minutes is provided between said inner and outer faces.

15. The container as claimed in claim 10, wherein the wall thickness of the bottom wall tapers from its outer longitudinal edge to the axis of the hinge devices.

\* \* \* \* \*